(12) United States Patent
Karlsson

(10) Patent No.: US 12,429,149 B2
(45) Date of Patent: Sep. 30, 2025

(54) ROUND SEAL

(71) Applicant: Roxtec AB, Karlskrona (SE)

(72) Inventor: Andreas Karlsson, Karlskrona (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 17/769,443

(22) PCT Filed: Oct. 19, 2020

(86) PCT No.: PCT/SE2020/051000
§ 371 (c)(1),
(2) Date: Apr. 15, 2022

(87) PCT Pub. No.: WO2021/080483
PCT Pub. Date: Apr. 29, 2021

(65) Prior Publication Data
US 2024/0125411 A1     Apr. 18, 2024

(30) Foreign Application Priority Data
Oct. 23, 2019   (SE) .................................... 1951204-5

(51) Int. Cl.
*F16L 5/08*      (2006.01)
*H02G 3/22*      (2006.01)

(52) U.S. Cl.
CPC . *F16L 5/08* (2013.01); *H02G 3/22* (2013.01)

(58) Field of Classification Search
CPC ....................................................... F16L 5/08
See application file for complete search history.

(56) References Cited

U.S. PATENT DOCUMENTS

| | | | |
|---|---|---|---|
| 3,794,333 A * | 2/1974 | Czernik ................. | F16J 15/123 277/593 |
| 4,656,313 A * | 4/1987 | Moore ................. | H05K 9/0018 174/362 |
| 5,697,194 A * | 12/1997 | Gignac ................ | G02B 6/4471 52/220.8 |
| 11,235,964 B2 * | 2/2022 | Nebbia Colomba .. | B65D 53/06 |
| 2004/0100040 A1 | 5/2004 | Sakno | |
| 2005/0011663 A1 * | 1/2005 | Kreutz ..................... | H02G 3/22 174/61 |
| 2009/0126992 A1 | 5/2009 | Horn | |
| 2010/0001476 A1 * | 1/2010 | Broder ...................... | F16L 5/08 277/606 |
| 2018/0135667 A1 * | 5/2018 | Milton ..................... | H02G 3/22 |

FOREIGN PATENT DOCUMENTS

| | | | | |
|---|---|---|---|---|
| CN | 204345022 U | | 5/2015 | |
| CN | 209001533 U | * | 6/2019 | |
| DE | 60203144 T2 | | 1/2006 | |
| WO | WO-2014038833 A1 | * | 3/2014 | ............... H02G 3/22 |
| WO | 2016/178621 A1 | | 11/2016 | |

* cited by examiner

*Primary Examiner* — Vishal A Patel
(74) *Attorney, Agent, or Firm* — Merchant & Gould P.C.

(57) ABSTRACT

A round seal (1) is provided comprising a cylindrical, compressible body (2), having a rectangular through opening (7). The round seal has fittings (3, 4) at opposite ends of the body (2) and a number of screws (5) going through holes of the body (2) and the fittings (3, 4). Nuts (6) are received on the screws (5). An axial length of the body 5 (2) is larger at the area of the corners of the through opening (7) than at the rest of the body (2).

6 Claims, 1 Drawing Sheet

ROUND SEAL

This application is a National Stage Application of PCT/SE2020/051000, filed 19 Oct. 2020, which claims benefit of Serial No. 1951204-5, filed 23 Oct. 2019 in Sweden, and which applications are hereby incorporated by reference in their entireties. To the extent appropriate, a claim of priority is made to each of the above disclosed applications.

TECHNICAL FIELD

The present invention concerns a round seal.

BACKGROUND

When cables, pipes or wires are to be lead through an opening in a partition in a sealed way, sometimes a round seal is used having a rectangular through opening for receiving one or more modules. The rectangular through opening may be square. Each one of the modules are to receive a cable, pipe or wire. The round seal has a cylindrical body with a central, through opening and fittings at opposite ends. The body is normally made of a rubber material, allowing compression. By means of screws and nuts, the fittings may be moved closer to each other to compress the body. When compressing a circular body having a rectangular or square central through opening, the corners of the through opening will have an unfavourable form, not giving completely straight corners. Such an unfavourable form will increase the risk of leakage.

A round seal of this kind is normally placed directly in an opening in the partition or in a sleeve received in the opening of the partition. The partition could be a deck or bulkhead of a ship, a wall of a cabinet, a technical shelter, a junction box or a machine, or a wall, floor or roof of a building.

SUMMARY

According to one aspect of the invention, a round seal is provided comprising a cylindrical body, fittings, screws and nuts. The body is compressible and has a rectangular through opening. Two fittings are placed at opposite ends of the body and the screws goes through openings in the body and the fittings. The nuts are received on the screws. An axial length of the body is larger at the area of the corners of the through opening than at the rest of the body.

Experiments and simulations have shown that by increasing the volume of material at the corners of a rectangular or square opening the body, the material at the corners will move further than if there is no increased volume of material. When modules are received in the through opening of the body, the extra volume of material will increase the contact pressure against said modules. Thus, by means of the extra volume of material at the corners of the through opening of the body, the deformation inwards in the corners of the opening is increased, thereby increasing the contact pressure against the modules and reducing the risk leakage.

Further objects and advantage of the present invention will be obvious to a person skilled in the art when reading the detailed description below.

BRIEF DESCRIPTION OF THE DRAWINGS

The invention will be explained further below by way of example and with reference to the enclosed drawings. In the drawings.

DETAILED DESCRIPTION

As used in this description, the expressions "axial", "radial" and similar expressions are in view of cables, pipes or wires received in the seal.

Figure 1:
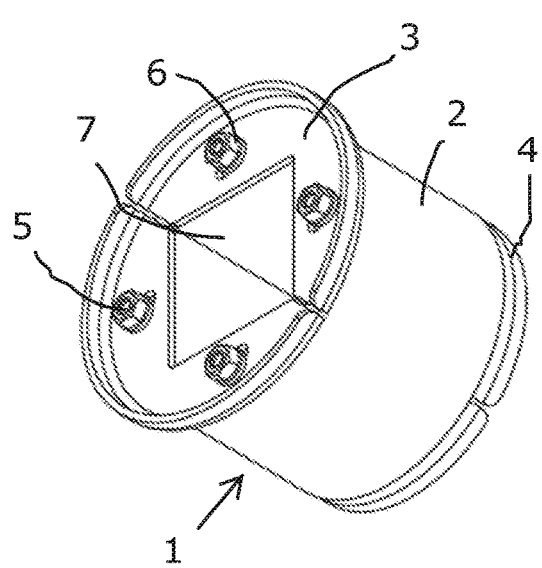
FIG. 1 shows a round seal.
Figure 2:
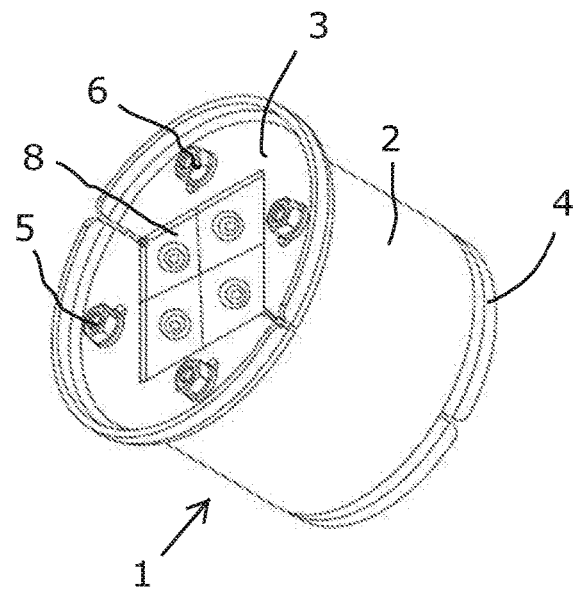
FIG. 2 shows the round seal of FIG. 1 with modules receive in an opening.

The round seal 1 of FIG. 1 comprises a cylindrical body 2, which body 2 is made of a rubber material or other compressible material. Fittings 3, 4 are provided at opposite ends of the body 2. A number of screws 5 goes through the body 2 and the fittings 3, 4.

The round seal 1 has a central through opening 7, which has a square form as seen in an end view. In other embodiments the through opening has a rectangular form that is not square. Inside said through opening 7, one or more modules 8 are to be received. Each module 8 is to be placed around a pipe, cable or pipe. The axial length of each module normally corresponds with or is a bit smaller than the axial length of the body 2. Possible modules 8 not receiving any pipe, cable or wire, will be closed off, for instance with a blind placed in the centre of the modules 8. In the shown embodiment the modules have a number of peelable layers, which layers are peeled off to adapted an inner diameter of the module 8 to an outer diameter of a pipe, cable or wire received inside the module 8.

By means of the screws 5 and cooperating nuts 6 the fittings may be moved in direction against each other, whereby the body 2 will be compressed in axial direction. By the compression in axial direction, the body 2 will expand in radial directions both inwards and outwards, sealing off the opening in the wall or the sleeve receiving the round seal 1. As used in this description the expression "compressible" in view of the body 2, means that the body 2 may be compressed by normal tightening of the screws 5 and nuts 6.

Figure 3:
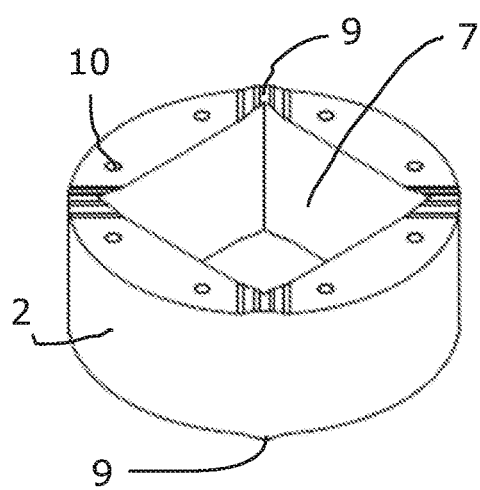
FIG. 3 shows a body of the round seal according to the present invention.
Figure 4:
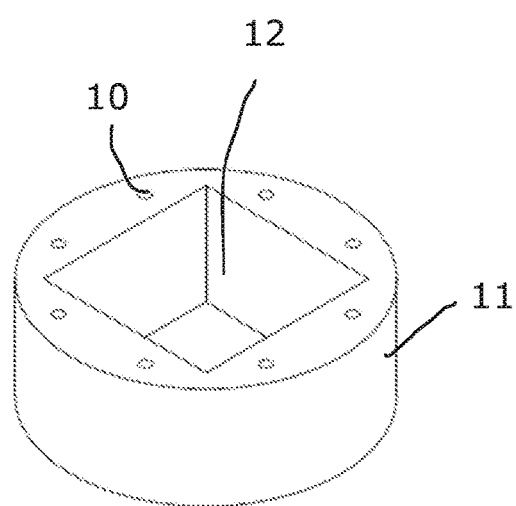
FIG. 4 shows a body of a round seal according to the prior art.

As shown in FIG. 3 the body 2 of the seal has protrusions 9 at the corners of the through opening 7. In the shown embodiment there are protrusions 9 at opposite ends of the body 2. In other embodiments there are only protrusions 9 on one side of the body 2. The protrusions 9 have the form of raised portions of the body 2. The protrusions 9 have a curved shape, with the top of the curve placed at a corner of the through opening 7 of the body 2. Thus, at the corners of the through opening 7, the body 2 will have a larger axial length than the rest of the body 2. The body 2 has a number of through holes 10, which are to receive the screws 5. Said through holes 10 have an axial orientation.

By means of the protrusions 9 the fittings 3, 4 will rest against said protrusions 9 before the screws 5 are tightened by the nuts 6. During compression the fittings 3, 4 will flatten the protrusions 9 to an extent depending on how much the screws are tightened. Due to the protrusions 9 the volume of material is larger at the corners of the through opening 7 of the body 2. Said larger volume of material will give a better and larger connection with the modules 8.

According to prior art the body 11 of a round seal of this kind has no protrusions at corners of a through opening 12. In the same way as the body 2 of the present invention, the body 11 of the prior art has a number of through holes 13, for receiving screws.

The round seal 1 is handled in the same way at mounting independently if it has a body 2 with protrusions 9 or if it has a body 11 without protrusions.

The invention claimed is:

1. A round seal comprising a cylindrical, compressible body having a rectangular through opening having four sides and four corners, fittings at opposite ends of the compressible body, at least four holes extending through the compressible body and the fittings and being located along the four sides of the through opening, a number of screws going through the at least four holes extending through the compressible body and the fittings, and nuts received on the screws,
  wherein the compressible body has first axial length portions and second axial length portions, wherein the first axial length portions are longer than the second axial length portions, and the first axial length portions are located at each of the four corners of the through opening, and the second axial length portions are located at a remainder of the compressible body,
  wherein the at least four holes are located circumferentially between the first axial length portions,
  wherein the fittings are configured to at least partially flatten the first axial length portions during compression of the compressible body by the fittings,
  wherein no first axial length portions are located between the at least four holes and rectangular through opening,
  wherein the compressible body comprises protrusions on at least one side of the compressible body, and
  wherein each of the protrusions extends from one of the corners of the through opening to an outer circumference of the compressible body.

2. The round seal of claim 1, wherein the protrusions are arranged on opposite sides of the compressible body.

3. The round seal of claim 1, wherein each of the protrusions has a curved shape, with a top of the curve at the corner of the through opening.

4. The round seal of claim 1, wherein one or more modules are received in the through opening of the compressible body.

5. The round seal of claim 1, wherein the compressible body is made of a rubber material.

6. The round seal of claim 1, wherein the rectangular through opening is square.

* * * * *